United States Patent [19]

Rutledge, Jr.

[11] Patent Number: 5,018,799
[45] Date of Patent: May 28, 1991

[54] ANTI-LOCK AIR BRAKE SYSTEM FOR WHEELED VEHICLES

[75] Inventor: Jack Rutledge, Jr., Jonesborough, Tenn.

[73] Assignees: John P. Squibb; W. B. Spratlin; James Widener, all of Johnson City, Tenn.

[21] Appl. No.: 495,650

[22] Filed: Mar. 19, 1990

[51] Int. Cl.⁵ .......................... B60T 8/36; B60T 8/38; B60T 13/68
[52] U.S. Cl. ..................................... 303/118; 303/119; 303/115
[58] Field of Search ................. 303/113, 115, 118, 119

[56] References Cited

U.S. PATENT DOCUMENTS

| | | | |
|---|---|---|---|
| 3,503,654 | 3/1970 | Stamm | 303/113 X |
| 3,853,357 | 12/1974 | Hitzelberger | 303/113 |
| 3,909,071 | 9/1975 | Klatt | 303/106 |
| 3,918,766 | 11/1975 | Klatt | 303/111 |
| 4,093,317 | 6/1978 | Lindemann et al. | 303/113 X |
| 4,576,419 | 3/1986 | Leiber | 303/111 X |

Primary Examiner—Matthew C. Graham
Assistant Examiner—Alfred Muratori
Attorney, Agent, or Firm—Malcolm G. Dunn

[57] ABSTRACT

Anti-lock system for the air brakes of wheeled vehicles to be interposed between the existing relay valves and air-actuated diaphragms for applying the brakes and to be actuatable alternately in a pulsing sequence by a pulse-generating circuit after a predetermined electrical time delay sufficient to allow full frictional brake engagement upon actuation by the operator of the air brakes so as to block air flow from the relay valves to the air-actuated diaphragms and to vent air from the air-actuated diaphragms, thereby causing momentary release of the brakes, and then to re-establish air flow from the relay valves to the air-actuated diaphragms and to block venting of air from the air-actuated diaphragms, thereby causing a re-application of the brakes; and a solenoid-controlled valve for the anti-lock system having passageways of critical length and diameter.

17 Claims, 3 Drawing Sheets

Fig. 1

ANTI-LOCK AIR BRAKE SYSTEM FOR WHEELED VEHICLES

BACKGROUND OF THE INVENTION

This invention relates to air brakes for wheeled vehicles such as trucks, tractors, trailers and buses, and particularly is directed to anti-lock air brake systems for minimizing the possibility of brake lock-up and the resultant skidding that may occur as a consequence, and possible jack-knifing that may occur, as between a tractor and trailer.

This invention more particularly is directed to an anti-lock air brake system that may either be built-in or interposed as a retrofit system in an existing vehicle air brake system between the relay valve, which distributes air service lines to the air-actuated diaphragms or brake actuators for each of the brakes in the vehicle, and the air-actuated diaphragms or brake actuators, which cause the brake shoes associated with such air-actuated diaphragms or brake actuators to be moved into frictional engagement with the associated brake drums to bring a wheeled vehicle to a controlled stop.

There are a number of anti-lock air brake systems in the prior art, such as U.S. Pat. Nos. 3,268,271; 3,545,818; 3,976,335; 3,976,336; 3,977,734; 4,035,034; 4,372,620; 4,538,859; and 4,708,403.

U.S. Pat. Nos. 3,976,336 and 4,035,034, mentioned above, depend upon the use of wheel sensors to sense slip rate of the wheels, and the use of computers to produce a throttling electric signal (a) to solenoid air control valves before the braking pressure reaches a certain pressure increase target value or (b) when the braking pressure is drawing near a certain pressure decrease target value, so as to maintain a certain specified slip rate. U.S. Pat. No. 4,372,620 is another example of the use of wheel sensors. U.S. Pat. No. 4,538,859 employs a pendulum that serves to select the mode of braking, such as intermittent or conventional.

U.S. Pat. Nos. 3,268,271 and 3,545,818, mentioned above, disclose details of typical cyclic air valves for use in preventing wheel skid, while U.S. Pat. No. 4,708,403 discloses an air valve control which provides rapid OFF-and-ON impulses manually without the use of electrical or electronic controls, and which is dependent upon the amount of force applied by the operator against the brake pedal. U.S. Pat. Nos. 3,976,335 and 3,977,734 disclose other valve structures used in controlling braking pressure.

The present invention differs over the prior art in that there are not computers or wheel sensors involved. One significant difference is that the anti-locking braking system is initiated each and every time the operator applies the brakes, either by use of the foot-actuated valve, which in the instance of a tractor and a trailer, for example, controls the brakes for both the tractor and trailer, or by use of the hand-actuated valve for controlling only the brakes of the trailer. If, however, the operator only taps the foot-actuated valve so that the braking pressure does not exceed 10 pounds (psi), then the anti-locking braking system is not initiated.

Some advantages resulting from the operator initiation of the anti-locking system of the present invention over the prior art include, in addition to being preventive against lock-up of the brakes, a saving on brake wear due to the momentary cooling that occurs when the brakes are momentarily released during the hereinafter-described pulsing sequence. There is also a saving on tires since the tires will not be flat-spotted as a consequence of locking and thereafter dragging them, thus undesirably wearing inches of rubber off the tires where they contact the roadway.

The present invention takes into consideration the realities of truck, trailer and bus operation. As a practical matter, there are often a certain amount of mechanical deficiencies present, such as differences in adjustments between the slack adjuster arm on the brake actuator on each end of the same axle for a truck or trailer or bus, and differences in the radial distances brake shoes have to travel before coming into full frictional engagement with the drums of the associated wheels. There can also be differences in drum diameters. Further, one tire may be more worn than a tire at the opposite end of the same axle. Consider, for instance, what happens when one wheel on an axle has a drum having a greater circumference than the drum of the other wheel on the same axle. The greater-circumferenced drum causes the associated wheel to want to travel farther than the smaller-circumferenced drum and associated wheel, with the end result that this tends to cause the vehicle or trailer to turn toward the direction of the drum with the smaller circumference. The anti-locking braking system of the present invention tends to compensate for differences such as these by providing each time of operator brake initiation a momentary release of the brakes during the hereinafter-described pulsing sequence, which, in the instance of a smaller-circumferenced drum or worn tire on one end of an axle, allows the smaller-circumferenced drum or worn tire to speed up. The result is that there is a tendency to equalize the paths of the wheels on the same axle to keep them traveling in a straight-line direction and thereby bring the wheeled vehicle to a safe stop.

The timing of the momentary release of the brakes, as will hereinafter be described, is such as to allow only a slight release of the air-actuated diaphragms, which control the movement of the brake shoes into frictional engagement with the brake drum. This tends to make application of the brakes smoother because the distances traveled by the slack adjuster arm, the rotation of the S-cam for the brake shoes and the radial travel for engagement of the brake shoes carrying the frictional material all act as though they are in mechanical balance at all times. This occurs because of the fact that the control is initiated simultaneously on each wheel instead of only affecting the locking wheel, as would be the case in the prior art with use of wheel sensors. This resulting mechanical balance, therefore, tends to cause the vehicle to stay in a straight line upon braking to a stop. There will also be less steering input required on the part of the operator.

Still another advantage over the prior art: when driving around a curve in the road with one wheel traveling faster than the other on the same axle, the present invention does not sense a brake lock-up in fact, as sometimes occurs with the use of wheel sensors. The wheel sensor falsely senses that a slower-rotating wheel is locking up and thus undesirably causes more braking force to be applied to the faster-rotating wheel and at the same time releases braking force on the slower rotating wheel. This causes an unstable condition that tends to drag a trailer, for instance, out into the other lane of traffic. The invention, therefore, ignores differences in circumferential speed and thus maintains stability in control of the vehicle.

DISCLOSURE OF THE INVENTION

In accordance with the present invention, I provide an anti-lock system for air brakes connected to each of the wheels of a wheeled vehicle and being movable into frictional engagement with the wheels to retard their rotation. The air brakes are connected to an existing operable arrangement for moving them into frictional engagement and have a retracting arrangement for moving the air brakes away from frictional engagement. The operable arrangement includes (a) an air supply for supplying an air flow; (b) air-actuated diaphragms operably connected to the air brakes to move the air brakes into frictional engagement by the air flow; (c) a relay valve movable between open and closed conditions, and when in the open condition being fluidically connected to the air supply for receiving therefrom for distribution thereof to and for actuation of the air-actuated diaphragms; and (d) operator-actuated valves fluidically connected to and between the air supply and the relay valve and actuatable by an operator for fluidically connecting the air supply to the relay valve and thereby move the relay valve from closed condition to open condition. The anti-lock system of the invention is interposed between the relay valve and the air-actuated diaphragms and is actuatable alternately in a pulsing sequence:

(a) for blocking air flow from the relay valve to the air-actuated diaphragms and for venting the release of air from the air-actuated diaphragms, thereby enabling the retracting arrangement to move the air brakes away from frictional engagement, and (b) for re-establishing air flow from the relay valves to the air-actuated diaphragms and for blocking the release of air from the air-actuated diaphragms, thereby enabling the air-actuated diaphragms again to move the air brakes into frictional engagement.

The anti-lock system as interposed includes a pulse-generating circuit for providing the pulsing sequence and an electrical timed delay arrangement actuatable by the operator-actuated valves being actuated by the operator to delay the beginning of the pulsing sequence for a length of time sufficient to enable the air brakes to be fully moved into frictional engagement and thereafter to actuate the pulse-generating circuit.

The anti-lock system includes a control valve arrangement that is fluidically connected to and between the relay valve and the air-actuated diaphragms. The control valve arrangement is movable (a) to a closed position for blocking the air flow from the relay valve to the air-actuated diaphragms and for venting the release of air from the air-actuated diaphragms through the control valve to atmosphere, and (b) to an open position for re-establishing air flow through the control valve from the relay valve to the air-actuated diaphragms and for blocking the release of air from the air-actuated diaphragms.

The control valve has an arrangement for moving it from closed position to open position and includes an arrangement for moving the control valve from the open position to the closed condition.

The arrangement for moving the control valve to the aforementioned closed position includes an electrically operated solenoid valve movable between (a) a first position for being fluidically connected to the air supply to enable air to flow from the air supply through the solenoid valve to the control valve, thereby moving the control valve to closed position, and (b) a second position for being fluidically disconnected from the air supply, thereby blocking the air flow from the air supply to the solenoid valve.

The electrical timed delay provides a delay of about 500 milliseconds before actuating the pulse-generating circuit. The pulse-generating circuit provides a pulsing sequence comprising an on-pulse lasting about 48 milliseconds for venting the release of air and an off-pulse lasting about 67 milliseconds to enable re-establishing the air flow to the air-actuated diaphragms to occur. The pulsing sequence of on- and off-pulses upon the operator-actuated valves being actuated lasts for about 10 seconds and then stops.

The operator-actuated valves may be foot- or hand-actuated.

When the anti-lock system is installed on a tractor, an arrangement is provided for turning off the anti-lock system when the tractor connects with a trailer having either an incompatible anti-lock system or no anti-lock system.

When the anti-lock system is installed on a tractor and on a trailer, an arrangement is provided for turning off the anti-lock system for the tractor when a hand-actuated valve in the tractor is actuated by the tractor operator.

The control valve has a valve body which defines therewithin (a) a valve chamber, (b) air supply inlet port defining a first passageway leading into the valve body and into the valve chamber for the air flow from the relay valve, (c) air supply outlet port defining a second passageway leading from the valve chamber and out of the valve body for the air flow from the valve chamber to the air-actuated diaphragm, (d) exhaust outlet port defining a third passageway leading from the valve chamber and out of the valve body to atmosphere for the air flow from the valve chamber, and (e) pilot air inlet defining a fourth passageway leading into the valve body and into the valve chamber for pilot air flow into the valve chamber.

The valve body also has a valve spool disposed within the valve chamber for reciprocal movement therein between two positions. The valve spool has at one end a surface which forms in cooperation with the valve chamber an expansible end chamber and is adapted to be moved axially from a first position to a second position by and upon commencement of pilot air flow into the expansible end chamber against the aforementioned end surface of the valve spool. The valve spool also has an arrangement for moving the valve spool in return to the first position upon cessation of the pilot air flow.

The valve spool, when in the first position, defines with the valve chamber a first air passage for enabling the air flow to flow from the first passageway into and through the valve chamber and into the second passageway. When the valve spool is in the second position, it defines with the valve chamber a second air passage for enabling the air flow to flow in return through the second passageway into the valve chamber and from the valve chamber and into the third passageway to atmosphere.

A control arrangement is provided with the aforementioned fourth passageway between the pilot air inlet and the valve chamber for controlling the pilot air flow into the valve chamber. This control arrangement comprises an electrically operated solenoid valve movable between (a) an open position for being fluidically connected to the air supply to enable air to flow from the air supply through the solenoid valve to the control valve, thereby moving the control valve to the aforementioned second position, and (b) a closed position for being fluidically disconnected from the air supply means, thereby blocking the air flow from the air supply to the solenoid valve. The diameter of each of the first, second and third passageways in the control valve is no greater than about 0.240 inch to about 0.280 inch, and preferably is about 0.250 inch. The length of each of the first, second and third passageways leading, respectively, to and from the valve chamber is about 0.315 inch to about 0.325 inch.

BRIEF DESCRIPTION OF THE DRAWINGS

The details of my invention will be described in connection with the accompanying drawings, in which.

BEST MODE FOR CARRYING OUT THE INVENTION

Figure 1:
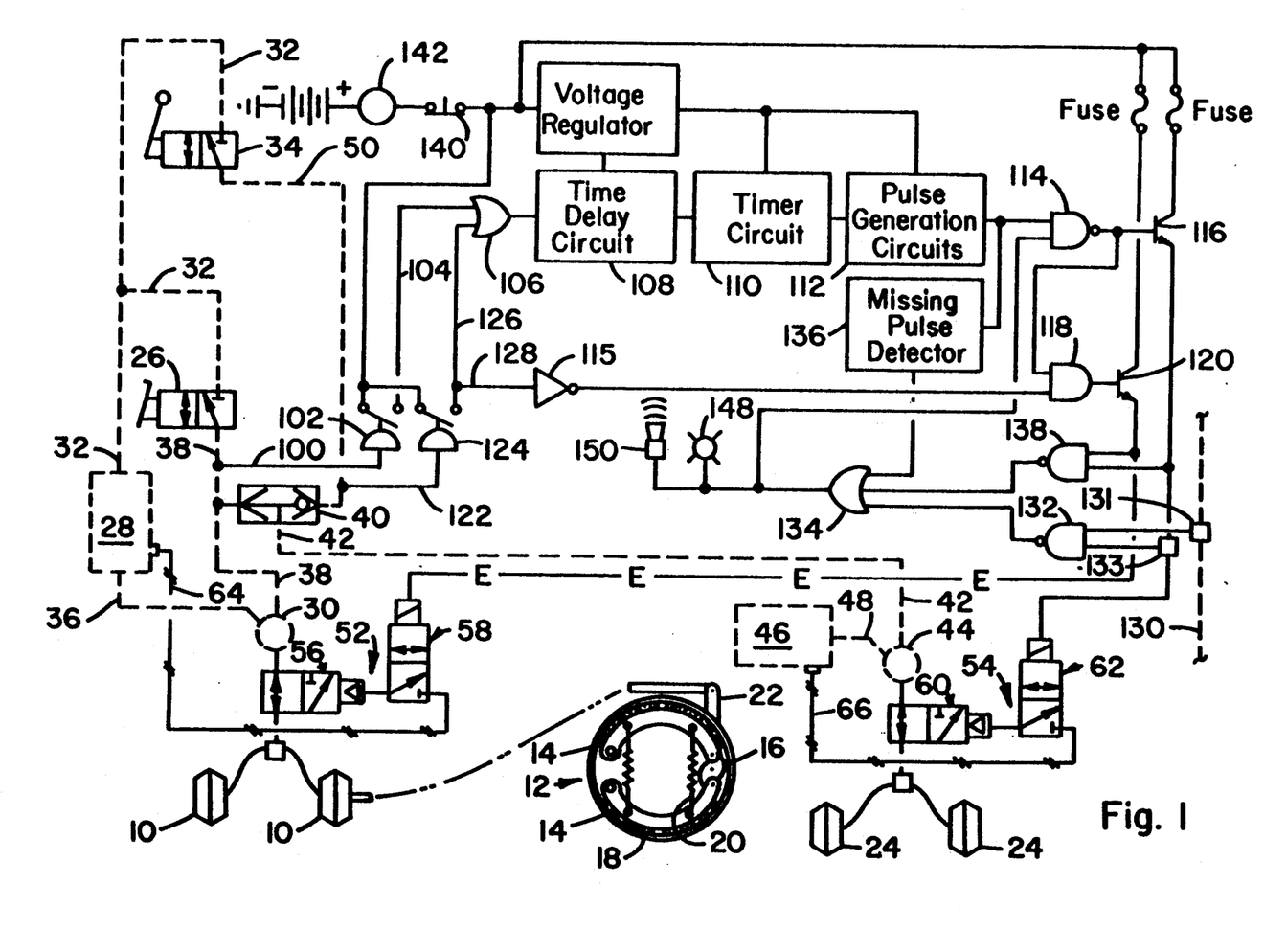
FIG. 1 is a schematic view illustrating the service air lines leading from the service air supply, foot- and hand-actuated valves to the relay valves for ultimate distribution to the air-actuated diaphragms for applying the brakes, the control valves of the anti-lock braking system interposed between the relay valves and the air-actuated diaphragms, and the electrical circuitry for providing a pulsing sequence to the control valves.

In reference to the drawings and initially to the schematic drawing shown in FIG. 1, 10 is directed to symbols representing air-actuated diaphragms, otherwise also called "brake actuators," for a single axle of a tractor, for example. Each air-actuated diaphragm will control the application of the brake shoes for one wheel (not shown) of the tractor. Tractors of the type for pulling trailers usually have a front axle, a drive axle and a tag axle. For purposes of illustration of the operation of the present invention, only one axle is shown for the tractor in FIG. 1, and its air-actuated diaphragms and their actuation will be understood to apply also to each and every axle as well as to the axles of trucks and buses which are usually not connected to trailers for pulling them along the roads and highways.

A representative brake shoe arrangement is shown at 12 having a pair of brake shoes 14, an S-cam 16 for camming the brake shoes into frictional engagement with the drum 18, springs 20 for retracting the brake shoes 14 from frictional engagement with the drum, and a slack adjuster arm 22 operatively connected to and between the S-cam and one of the air-actuated diaphragms.

The air-actuated diaphragms shown at 24 represent what would be on a trailer, for example, for controlling the air brakes on each axle. Typically, there would be two axles on a trailer of the type pulled by a tractor.

A typical existing air brake system for the tractor mentioned above and with which the anti-lock braking system of the present invention would be retrofitted comprises, in addition to the aforementioned air-actuated diaphragms 10, a foot-actuated valve 26, an air supply reservoir 28, and a relay valve 30 for distributing air to the respective air-actuated diaphragms when the operator of the tractor actuates the foot-actuated valve 26.

Air service line 32 extends from one side of the air supply reservoir 28 to provide a waiting air flow pressure to one side of the foot-actuated valve 26 and to one side of a hand-actuated valve 34. The hand-actuated valve 34 is provided for the tractor operator so as to actuate only the air brakes of a trailer and to cut off any possible actuation of the tractor air brakes. One purpose, for example, for using the hand-actuated valve 34 is when it becomes necessary to straighten the travel of the trailer relative to the tractor.

Air service line 36 extends from the other side of the air supply reservoir 28 of the tractor to provide a waiting air flow pressure to one side of the relay valve 30. When the tractor operator actuates the foot-actuated valve 26, air flow from the air supply reservoir 28 flows along air service line 32 through the foot-actuated valve to the air service line 38 for subsequent flow to the relay valve 30. This causes the relay valve to move from a closed condition to an open condition and thus become fluidically connected to the air supply reservoir 28 and thereby allow air flow from the air supply reservoir 28 to flow along air supply service line 36 to and through the relay valve 30 for subsequent distribution of air flow to the respective air-actuated diaphragms 10. The air flow also passes through one end (the left as viewed in FIG. 1) of and into the shuttle valve 40 for flow out through air service line 42 for subsequent flow to one side of relay valve 44 for the trailer air brakes.

Air supply reservoir 46 for the trailer air brakes provides a waiting air flow pressure through air service line 48, which extends from one side of the air supply reservoir 46 to one side of the relay valve 44. When the air flow through air service line 42 causes relay valve 44 to move from closed to open condition, air flow from the air supply reservoir 46 passes along air service line 48 to and through relay valve 44 for subsequent distribution to the respective air-actuated diaphragms 24. The air brakes (not shown) for the trailer would be similar in appearance and operation to the representative one shown at 12 for the tractor.

The shuttle valve 40 is shown in FIG. 1 in its normal position with the ball of the valve closing off the illustrated right end of the shuttle valve. This shuttle valve enables the foot-actuated valve 26 to control the actuation of both the tractor and trailer air brakes. When the hand-actuated valve 34 is actuated by the tractor operator, air flow from the air supply reservoir 28 flows through air service line 32 to, through and out of the hand-actuated valve 34 for flow through air service line 50 to one side of the shuttle valve 40. This air flow forces the ball of the shuttle valve to shift to the opposite position from that shown in FIG. 1, thereby enabling air flow to pass out of the shuttle valve for flow along air service line 42 to the trailer relay valve 44 for subsequent actuation of the trailer air brakes. When, therefore, the ball of the shuttle valve 40 shifts to the opposite position of the valve, no air flow can mistakenly flow through the illustrated left end of the shuttle valve toward the relay valve for the tractor air brakes.

The preceding discussion applies to typical existing air brake structure and operation in a tractor and a trailer, or in a truck, or in a bus or any other wheeled vehicle employing air brakes. A truck or bus, or course, would not normally be connected to a trailer, but its air brakes would be operated in a similar manner with the exception that the air brake system of a truck or bus would not normally include a hand-actuated valve.

ANTI-LOCK BRAKING SYSTEM

The anti-lock braking system of the invention, as heretofore mentioned, is designed to be retrofitted, i.e. interposed, between the existing respective relay valves 30, 44 and the respective air-actuated diaphragms 10, 24 of the tractor and trailer.

A solenoid-controlled valve, indicated at 52, is fluidically connected to and between the relay valve 30 and the air-actuated diaphragms 10 of the tractor. Similar ones are provided for the trailer, as shown at 54. Each solenoid-controlled valve is actuated by a pulsing sequence generated by electrical circuitry that will be described.

Figure 2:
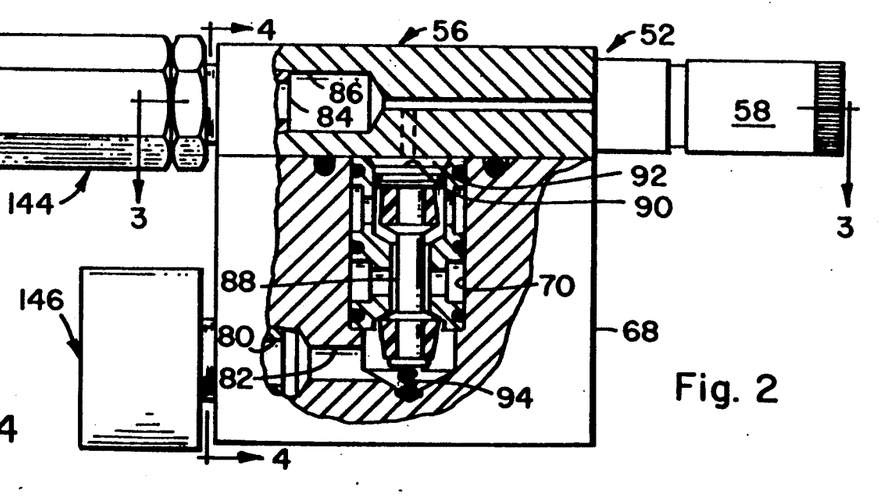
FIG. 2 is an elevation view of the control valve and solenoid valve, with the control valve being shown partially broken away and in cross-section to illustrate the valve chamber, the valve spool in normal open condition and the air passages extending between the control valve and the solenoid valve.
Figure 3:
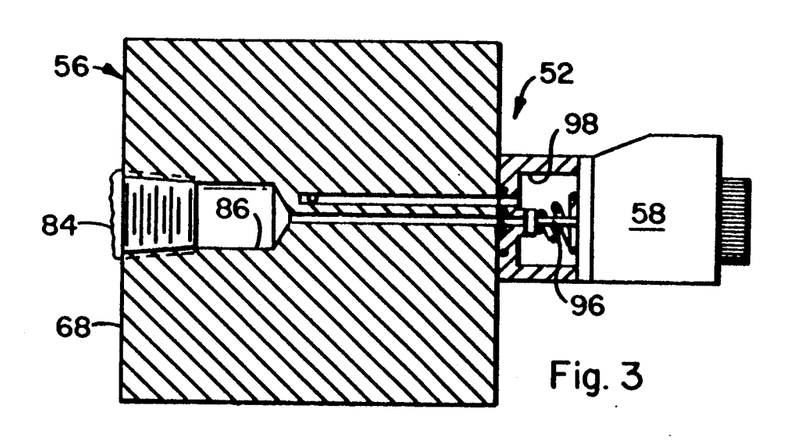
FIG. 3 is a cross-sectional plan view of the control valve shown in FIG. 2, and illustrates the air passages extending between the control valve and the solenoid valve and the valve chamber in the solenoid valve, with a spring-biased shuttle pin in the solenoid valve being shown in closed condition.
Figure 4:
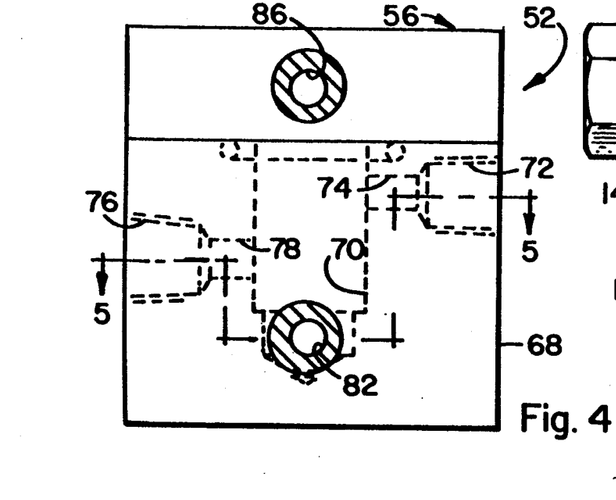
FIG. 4 is a cross-sectional view of the control valve taken along line 4—4 of FIG. 2.
Figure 5:
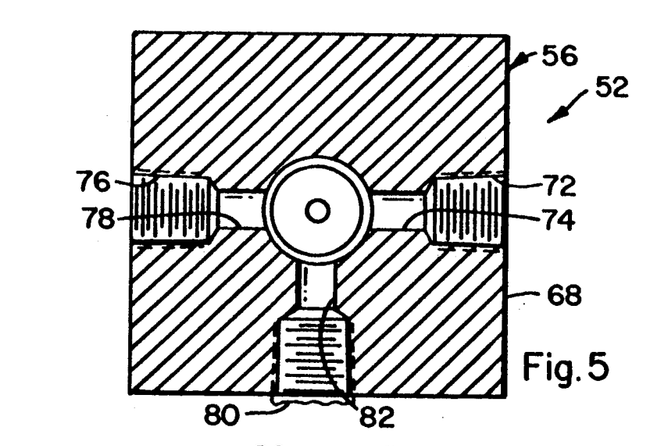
FIG. 5 is a cross-sectional view of the control valve taken along line 5—5 of FIG. 4.

The solenoid-controlled valve 52, for instance, comprises an air flow control valve 56 and a solenoid valve 58, and although they are symbolically indicated as being separated, reference to FIGS. 2 and 3 shows that they are actually joined to form a single unit. The drawings in FIGS. 2-4 illustrate only one of the solenoid-controlled valves 52, but it should be understood that its description will also apply to solenoid-controlled valve 54 comprising an air flow control valve 60 and solenoid valve 62 for the trailer. In reference, again, to FIG. 1, an air service line 64 is provided between the air supply reservoir 28 and one side of the solenoid valve 58 for the tractor. An air service line 66 is provided between the air supply reservoir 46 and one side of the solenoid valve 62 of the trailer.

In reference to FIGS. 2, 3, 4 and 5, the air flow control valve 56 has a valve body 68, which defines therewithin a valve chamber 70. An air supply inlet port 72 defines a first passageway 74 leading into the valve body 68 and into the valve chamber 70. An air supply outlet port 76 defines a second passageway 78 leading from the valve chamber 70 and out of the valve body 68. An exhaust outlet port 80 defines a third passageway 82 leading from the valve chamber 70 and out of the valve body to atmosphere. Pilot air inlet 84 defines a fourth passageway 86 leading into the valve body 68 and into the valve chamber 70 for pilot air flow into the valve chamber.

The inlet port 72 and the outlet ports 76 and 80 are shown in the drawings as being threaded to receive the appropriate service air line fittings (not shown). The first passageway 74, the second passageway 78 and the third passageway 82 each have been found, through experimentation, to have a critical diameter and a critical length, without which the anti-lock system of the invention would not be operative. The aforementioned inlet and outlet ports do not have such effect. The critical diameter of each of the aforementioned passageways should be no greater than about 0.240 inch to about 0.280 inch, and preferably about 0.250 inch. The critical length of each of the first, second and third passageways should be about 0.315 inch to about 0.325 inch. It has been found that if the diameter of the aforementioned passageways is too large, the amount of air lost during the venting cycle, i.e., venting of air from the air-actuated diaphragms, will be too much and, upon re-application of the brakes, it will take longer to build up sufficient air pressure so as to re-apply the brakes in full frictional engagement. Thus, the maximum retarding force never will be reached. If the diameter is too small, the venting of air will not occur fast enough to ensure a release of the brakes from full frictional engagement.

If the passageways mentioned above are too long, the air flow will tend to attach itself to the walls of the passageways, thereby creating little turbulences along the length of the passageways. This has the effect of increasing the length of time for a given amount of air to flow through these passageways. The net result of the aforementioned attached air or little turbulences is to reduce the cross-sectional area of the passageways. The length, therefore, of each of these passageways is critical to the overall timing of the pulsing sequence.

The valve body 68 also has a valve spool 88 disposed within the valve chamber 70 for reciprocal movement in the valve chamber between two positions. The valve spool has at one end a surface 90 which forms in cooperation with the surrounding valve chamber 70 an expansible end chamber 92. The valve spool is adapted to be moved axially from an open position to a closed position by and upon commencement of pilot air flow into the expansible end chamber 92 against the one end surface of the valve spool. A spring arrangement 94 causes the valve spool to return to its first position upon cessation of the pilot air flow.

Figure 6:
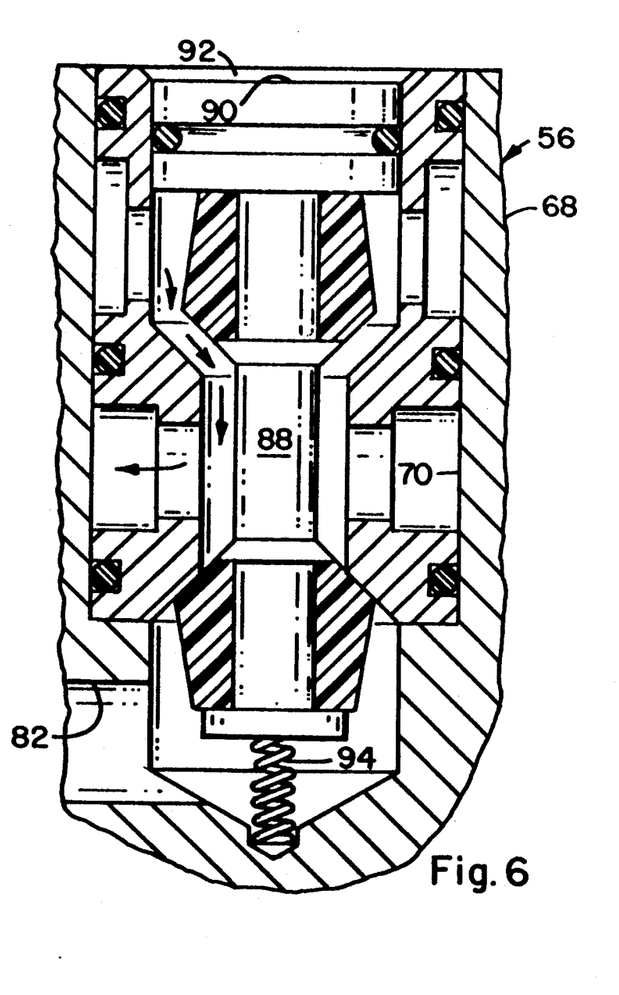
FIG. 6 is a fractional portion of the view shown in FIG. 2 but enlarged to illustrate the air flow relative to the spool valve when in its first position.
Figure 7:
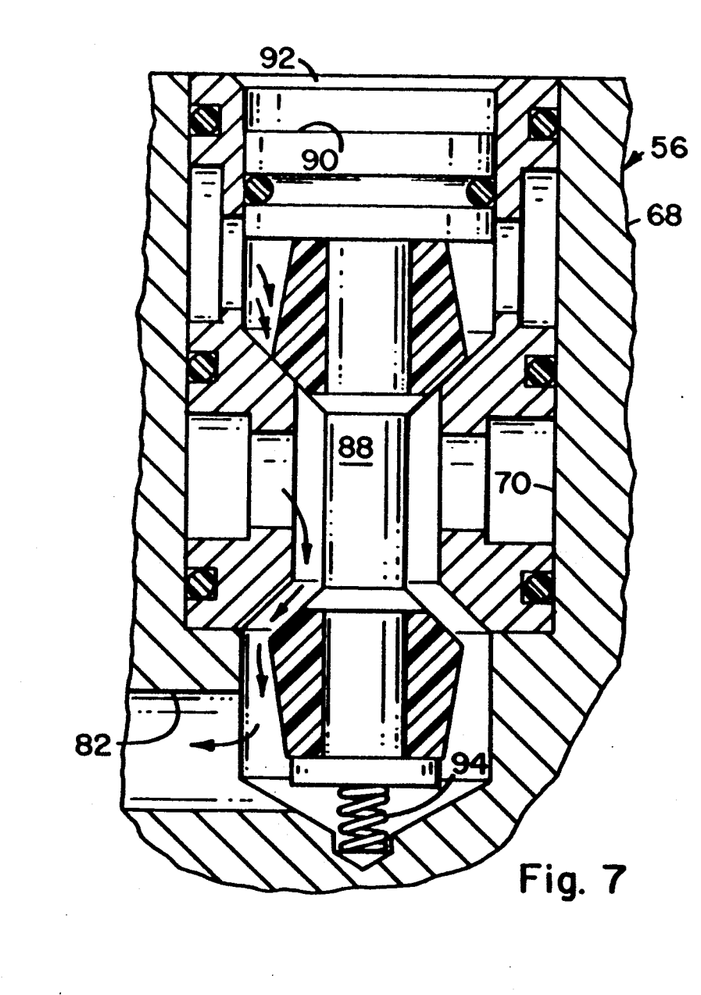
FIG. 7 is a view similar to the view shown in FIG. 6 to illustrate the air flow relative to the spool valve when in its second position.

In reference to FIGS. 2 and 6, when the valve spool 88 is in the aforementioned open position, which is the position illustrated in FIGS. 2 and 6, the valve spool defines with the valve chamber a first air passage for enabling air flow to flow from the first passageway 74 into and through the valve chamber 70 and into the aforementioned second passageway 78. When the valve spool 88 is in the aforementioned closed position, as shown in FIG. 7, it defines with the valve chamber a second air passage for enabling air flow to flow in return through the second passageway 78 into the valve chamber and from the valve chamber and into the aforementioned third passageway 82 to atmosphere.

A control is provided within the fourth passageway 86 between the pilot air inlet 84 and the valve chamber 70 in the form of the aforementioned solenoid valve 58 so as to control pilot air flow into the valve chamber. The solenoid valve is movable between a first position for fluidically connecting the solenoid valve to the air supply reservoir 28 and a second position for being fluidically disconnected from the air supply reservoir. More specifically, the solenoid valve is provided with a shuttle pin 96 which is normally spring-biased to a closed position, i.e., the aforementioned second position, when not actuated, as shown in FIG. 3. When the solenoid valve is triggered into actuation, by the aforementioned pulsing sequence, as in the manner to be described, the shuttle pin moves against its spring-bias to open position, i.e., the aforementioned first position. This movement enables air flow to flow through the fourth passageway 86 from the air flow control valve 56 and into the solenoid valve chamber 98. The air flow flows out of the solenoid valve chamber 98 and continues along the remainder of the fourth passageway 86 until it reaches the expansible end chamber 92 where it pushes against the end surface 90 of the spool valve to cause the spool valve to move axially to the aforementioned closed position.

The respective solenoid control valves 52, 54 of the anti-lock braking system for the tractor and trailer air brakes in FIG. 1, described above, are normally in the open position to allow air flow to flow from the respective relay valves 30, 44 through a first and second passageway in the solenoid control valves and to the respective air-actuated diaphragms 10, 24, when the tractor operator activates the foot-actuated valve 26 to apply the air brakes.

OPERATION

The aforementioned pulsing sequence for triggering the solenoid-controlled valves will now be described in connection with what occurs when a tractor operator, or truck operator, or bus operator, as the case may be, actuates either the foot-actuated valve 26 or the hand-actuated valve 34. In the instance of use of the anti-lock system on a tractor and on a trailer connected to the tractor so as to be drawn by the tractor, it should be understood that the electrical circuitry involving the time delay circuit, timer circuit, pulse-generation circuits and the logic circuits associated therewith, as will be hereinafter described, would only be installed on the tractor and would not be installed on the trailer. Only the solenoid-controlled valve would be installed on the trailer, and preferably there would be one such solenoid-controlled valve for each axle to control the associated brakes on an axle. When it is mentioned herein, therefore, that the anti-lock system is installed on the tractor and on the trailer, the phrase "anti-lock system" has two meanings and is intended in one instance to refer to what would normally be installed on a tractor, and in another instance to refer to what would normally be installed on a trailer.

In reference to FIG. 1 and looking at the actuation of the foot-actuated valve 26 first with a regard to a tractor-trailer operation: when the operator activates this valve by foot, air flow is initiated to flow from the respective air supply reservoirs 28, 46 to the respective air-actuated diaphragms 10, 24 in the manner heretofore described. The respective solenoid control valves 52, 54, as previously mentioned, are in an open position to allow air flow to flow therethrough to the air-actuated diaphragms unimpeded.

At the same time the operator actuates the foot-actuated valve 26 to cause air flow to commence flowing to the air brakes, there is also an air flow along air service line 100 to the pressure switch 102. The latter is a diaphragm-type switch which is closed by the air flow to complete an electrical circuit with the battery of the vehicle involved. The resulting electrical signal provides along input line 104 an input to one side of the OR gate 106, and this results in an output to initiate a time-delay circuit, as shown at 108, for providing a timed delay of about 500 milliseconds. The purpose of this timed delay is to allow the brake shoes of the air brakes to become fully frictionally engaged with their respective drums before the pulsing sequence is initiated.

At the conclusion of the timed delay of about 500 milliseconds, the timer circuit 110 and pulse-generating circuits 112 are actuated, with the time for such actuation lasting about 10 seconds and then the system shuts down until the next actuation of the foot-or hand-actuated valve by the operator.

For example: a tractor drawing a fully loaded trailer having 42,000 pounds of cargo, with the combined gross weight of both being about 72,000 pounds, and moving at 60 miles per hour, can be brought to a stop in about 6.5 seconds with the anti-lock braking system of the present invention. The provision of 10 seconds for the pulsing sequence provides more latitude for the operator without causing too much air to be lost from the air supply reservoirs.

The pulse-generating circuits provide a series of on- —and off-pulses as outputs to serve as inputs to NAND gate 114, the outputs from which serve as inputs to the base of trailer output transistor 116 and to one side of the AND gate 118. An inverter 115 is high at its output side and thus provides the other input to the other side of the AND gate 118 to obtain an output from the latter to serve as input to the base of transistor 120 for the tractor. The respective transistors are turned on and their outputs serve as inputs to the respective solenoid valves 58, 62 of the solenoid-controlled valves 52, 54 for the tractor and trailer.

When a solenoid-controlled valve is triggered into actuation, an on-pulse lasting about 48 milliseconds causes the valve spool to be moved in the manner described above to a closed position in which the flow of air flow from a relay valve to the air-actuated diaphragms is blocked. Upon such closure, air is vented from the air-actuated diaphragms through a third passageway in the air flow control valves 56, 60 to atmosphere. This venting of air allows the brake shoes to be retracted a small distance from full frictional engagement with the respective brake drums.

An off-pulse lasting about 67 milliseconds allows the spring arrangement 94 in the air flow control valve 56, for example, to return the valve spool in the reciprocal direction to the normally open position. In this manner, the air flow from the relay valves to the air-actuated diaphragms is re-established for moving the brake shoes into frictional engagement with the brake drums, while at the same time the release of air, as by venting from the air-actuated diaphragms, is blocked.

The extent of reciprocal movement in each direction of the valve spool is only about 0.063 inch, which enables the air flow control valve to be rapidly responsive, thus allowing an on- and off-pulse repetition rate of about 115 milliseconds, i.e., from leading edge to leading edge of the cycle.

HAND-ACTUATED VALVE

When the tractor operator wants to actuate only the air brakes of the trailer, upon actuation of the hand-actuated valve 34, the ball of the shuttle valve 40 is caused to shift to the opposite position from that shown in FIG. 1 and, in the manner heretofore described, air flow occurs along air service line 50 to and through the shuttle valve to the relay valve 44 for the trailer. At the same time, air flow occurs along air service line 122 to the pressure switch 124, which closes an electrical circuit with the battery of the vehicle, and thereby provides an input to input line 126 to the other side of OR gate 106 to serve as an input to the time delay circuit 108. An input, at the same time, is also provided along input line 128 to the inverter 115. Since the inverter reverses whatever its voltage input is, there will be no input from the inverter and thus no input to the AND gate 118. Since an AND gate requires two inputs to obtain an output, there will be no input to the base of the transistor 120 for the tractor. In this manner, the anti-lock system for the tractor air brakes is prevented from being actuated.

The output from the pulse-generating circuits 112 serve as input to the NAND gate 114 for subsequent output therefrom as input to the base of the transistor 116 for the trailer.

SYSTEM PROTECTIVE CIRCUITRY

The anti-lock braking system of the invention also provides a system protective circuitry, which comes into operation in the situation when a tractor is connected to a trailer that either does not have the anti-lock braking system of the invention or has an incompatible anti-lock braking system.

When the foot-actuated valve 26 or hand-actuated valve 34 is actuated under either of the situations mentioned above, simultaneously when the existing trailer brake light circuit, as represented at 130 in FIG. 1, is turned on, the pulse sequence normally intended for a trailer solenoid valve, if one had been present, senses in effect the absence of current flow because there is no trailer solenoid valve. Current-to-voltage conditioners (I/P) 131 and 133 are provided for the trailer brake light circuit 130 and on the output line for the trailer transister 116 to sense, therefore, the aforementioned absence of current flow to the trailer solenoid valve. The output from the NAND gate 114 provides an error input to one side of the NAND gate 132, and the existing trailer brake light circuit 130 provides an input to the other input side of NAND gate 132. The resulting output from NAND gate 132 becomes an input to one of the three inputs of the three-input OR gate 134, and the output from the three-input OR gate 134 goes to one side of the NAND gate 114. Since the pulsing sequence from the pulse-generating circuits 112 provides an input to one of the inputs of the NAND gate 114, and since the output from the OR gate 134 provides an input to the other input of the NAND gate 114, the resulting output from the NAND gate 114 is zero and thus the anti-lock system for the tractor air brakes is caused to shut off.

If, for some reason, there should be missing pulses from the pulse-generating circuits 112, a missing pulse detector 136 is provided to sense this and provides, upon such sensing, an output that serves as an input to another of three inputs of the three-input OR gate 134. This, therefore, also causes the anti-lock braking system to shut down in the same manner as described above.

If there should be a blown fuse in the anti-lock braking system, the NAND gate 138 also provides an output as input to the third input of the three-input OR gate 134, resulting in a shut-down of the anti-lock braking system in the same manner as described above.

The operator may, for whatever reason, choose to lock out or turn off the anti-lock braking system by pushing the button at 140, upon turning on the ignitiion switch shown at 142. The anti-lock braking system of the invention, as previously mentioned, is not triggered into operation until the operator exceeds ten (10) pounds actuation pressure, either by the foot-actuated valve 26 or by the hand-actuated valve 34. In this latter situation, the resulting air flow to the air-actuated diaphragms will only cause the brake shoes to become marginally applied for gradual retardation of rotation of the wheels of the wheeled vehicle.

An air filter 144 is provided for the pilot air inlet 84, and a dust excluder 146 is provided on the exhaust outlet port 80. The air filter prevents a build-up of foreign matter which might enter and restrict pilot air flow pressure. The dust excluder prevents wind-blown contaminants from entering into the exhaust passageway, which would also undesirably change the timing or render the anti-lock system inoperative. These should be installed to assure unimpeded operation of the system.

A visual alarm 148 and an audible alarm 150 are provided within the tractor or truck or bus so as to alert the operator in the event of a malfunctiion of the anti-lock system.

The invention has been described in detail with particular reference to preferred embodiments thereof, but it will be understood that variations and modifications can be effected within the spirit and scope of the invention.

I claim:

1. An anti-lock system for air brakes connected to each wheel of a wheeled vehicle and being movable into frictional engagement with said wheels to retard their rotation, said air brakes being connected to operable means for moving said air brakes into said frictional engagement and having retracting means for moving said air brakes away from said frictional engagement, said operable means including: (a) air supply means for supplying an air flow; (b) air-actuated diaphragm means operably connected to said air brakes to move said air brakes into said frictional engagement when actuated by said air flow; (c) relay valve means movable between open and closed conditions, and when in said open condition being fluidically connected to said air supply means for receiving therefrom for distribution of said air flow thereof to and for actuation of said air-actuated diaphragm means; and (d) operator-actuated valve means fluidically connected to and between said air supply means and said relay valve means and actuatable by an opertor for fluidically connecting said air supply means to said relay valve means and thereby move said relay valve means from said closed condition to said open condition; said anti-lock system comprising:

means interposed between said relay valve means and said air-actuated diaphragm means and being actuatable alternately in a pulsing sequence:

(a) for blocking said air flow from said relay valve means to said air-actuated diaphragm means and for venting the release of air from said air-actuated diaphragm means, thereby enabling said retracting means to move said air brakes away from said frictional engagement, and (b) for re-establishing air flow from said relay valve means to said air-actuated diaphragm means and for blocking said release of air from said air-actuated diaphragm means, thereby enabling said air-actuated diaphragm means again to move said air brakes into said frictional engagement;

said interposed means including pulse-generating circuit means for providing said pulsing sequence and electrical timed delay means actuatable by said operator-actuated valve means being actuated by said operator to delay the beginning of said pulsing sequence for a length of time sufficient to enable said air brakes to be fully moved into said frictional engagement and thereafter to actuate said pulse-generating circuit means.

2. An anti-lock system for air brakes as defined in claim 1, and wherein said interposed means includes control valve means fluidically connected to and between said relay valve means and said air-actuated diaphragm means and being movable;
   (a) to a closed position for said blocking said air flow from said relay valve means to said air-actuated diaphragm means and for said venting the release of air from said air-actuated diaphragm means through said control valve to atmosphere, and
   (b) to an open position for said re-establishing said air flow through said control valve means from said relay valve means to said air-actuated diaphragm means and for said blocking said release of air from said air-actuated diaphragm means;
said control valve means having means for moving said control valve means from said closed position to said open position and including means for moving said control valve means from said open position to said closed position.

3. An anti-lock system for air brakes as defined in claim 2, and wherein said means for moving said control valve means to said closed position includes an electrically operated solenoid valve means movable between
   (a) a first position for being fluidically connected to said air supply means to enable air to flow from said air supply means through said solenoid valve means to said control valve means, thereby moving said control valve means to said closed position, and
   (b) a second position for being fluidically disconnected from said air supply means, thereby blocking said air flow from said air supply means to said control valve means.

4. An anti-lock system for air brakes as defined in claim 1, and wherein said electrical timed delay means provides a delay of about 500 milliseconds before actuating said pulse-generating circuit means.

5. An anti-lock system for air brakes as defined in claim 1, and wherein said pulse generating circuit means provides a pulsing sequence comprising an on-pulse lasting about 48 milliseconds for said venting the release of air and an off-pulse lasting about 67 milliseconds to enable said re-establishing said air flow to said air-actuated diaphragm means to occur.

6. An anti-lock system for air brakes as defined in claim 5, and wherein said pulsing sequence of said on- and off-pulses upon said operator-actuated valve being actuated lasts for about 10 seconds and then stops.

7. An anti-lock system for air brakes as defined in claim 1, and wherein said operator-actuated valve means comprises a foot-actuated valve.

8. An anti-lock system for air brakes as defined in claim 1, and wherein said operator-actuated valve means comprises a hand-actuated valve.

9. An anti-lock system for air brakes as defined in claim 1, and wherein said interposed means comprises a control valve means having a valve body defining therewithin
   (a) a valve chamber,
   (b) air supply inlet port means defining a first passageway leading into said valve body and into said valve chamber for said air flow from said relay valve means,
   (c) air supply outlet port means defining a second passageway leading from said valve chamber and out of said valve body for said air flow from said valve chamber to said air-actuated diaphragm means,
   (d) exhaust outlet port means defining a third passageway leading from said valve chamber and out of said valve body to atmosphere for air flow from said valve chamber, and
   (e) pilot air inlet means defining a fourth passageway leading into said valve body and into said valve chamber for pilot air flow into said valve chamber;
said valve body also having a valve spool disposed within said valve chamber for reciprocal movement therein between two positions, said valve spool having at one end a surface which forms in cooperation with the surrounding said valve chamber an expansible end chamber and being adapted to be moved axially from a first position to a second position by and upon commencement of said pilot air flow into said expansible end chamber against said one end surface of the valve spool, said valve spool having means for moving said valve spool in return to said first position upon cessation of said pilot air flow.

10. An anti-lock system for air brakes as defined in claim 9, and wherein said valve spool when in said first position defines with said valve chamber a first air passage for enabling said air flow to flow from said first passageway into and through said valve chamber and into said second passageway, and when in said second position defines with said valve chamber a second air passage for enabling said air flow to flow in return through said second passageway into said valve chamber and from said valve chamber and into said third passageway to said atmosphere.

11. An anti-lock system for air brakes as defined in claim 9, and wherein control means is provided within said fourth passageway between said pilot air inlet means and said valve chamber for controlling said pilot air flow into said valve chamber.

12. An anti-lock system for air brakes as defined in claim 11, and wherein said control means comprises an electrically operated solenoid valve means movable between
   (a) an open position for being fluidically connected to said air supply means to enable air to flow from said air supply means through said solenoid valve means to said control valve means, thereby moving said control valve means to said second position, and
   (b) a closed position for being fluidically disconnected from said air supply means, thereby blocking said air flow from said air supply means to said solenoid valve means.

13. An anti-lock system for air brakes as defined in claim 9, and wherein the diameter of each of said first, second and third passageways is no greater than about 0.240 inch to about 0.280 inch.

14. An anti-lock system for air brakes as defined in claim 9, and wherein the diameter of each of said first, second and third passageways is about 0.250 inch.

15. An anti-lock system for air brakes as defined in claim 9, and wherein the length of each of said first, second and third passageways leading, respectively, to and from said valve chamber is about 0.315 inch to about 0.325 inch.

16. An anti-lock system for air brakes as defined in claim 1, and wherein said anti-lock system is installed on a tractor and includes means for turning off said anti-lock system when said tractor connects with a trailer having either an incompatible anti-lock system or no anti-lock system.

17. An anti-lock system for air brakes as defined in claim 8, and wherein said anti-lock system is installed on a tractor and on a trailer and includes means for turning off said anti-lock system for said tractor when said hand-actuated valve is actuated.

* * * * *